(12) United States Patent
Krawinkel

(10) Patent No.: US 7,309,524 B2
(45) Date of Patent: Dec. 18, 2007

(54) ADHESIVE AND ITS USE FOR AN AT LEAST ONE-LAYER PSA SHEET STRIP WHICH CAN BE REDETACHED WITHOUT RESIDUE OR DESTRUCTION BY EXTENSIVE STRETCHING SUBSTANTIALLY IN THE BOND PLANE

(75) Inventor: Thorsten Krawinkel, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 555 days.

(21) Appl. No.: 10/628,725

(22) Filed: Jul. 28, 2003

(65) Prior Publication Data

US 2004/0092663 A1    May 13, 2004

(30) Foreign Application Priority Data

Nov. 8, 2002  (DE) ................ 102 52 089

(51) Int. Cl.
  *C09J 153/02* (2006.01)
  *C08L 53/02* (2006.01)
  *C08F 8/04* (2006.01)
(52) U.S. Cl. ............... 428/355 BL; 428/343; 428/354; 428/317.3; 248/205.3
(58) Field of Classification Search ......... 428/355 BL, 428/343, 354, 317.3; 248/205.3
See application file for complete search history.

(56) References Cited

U.S. PATENT DOCUMENTS

| | | | |
|---|---|---|---|
| 4,024,312 A | 5/1977 | Korpman | 428/343 |
| 5,409,189 A | 4/1995 | Lühmann | 248/205.3 |
| 5,491,012 A | 2/1996 | Lühmann et al. | 428/40 |
| 5,507,464 A | 4/1996 | Hamerski et al. | 248/683 |
| 5,516,581 A | 5/1996 | Kreckel et al. | 428/317.3 |
| 5,626,932 A | 5/1997 | Lühmann et al. | 428/40.1 |
| 5,672,402 A | 9/1997 | Kreckel et al. | 428/34.2 |
| 5,725,923 A | 3/1998 | Lühmann | 428/40.1 |
| 5,897,949 A | 4/1999 | Lühmann et al. | 428/317.3 |
| 5,925,459 A | 7/1999 | Zimmermann et al. | 428/354 |
| 6,004,665 A | 12/1999 | Lühmann et al. | 428/317.3 |
| 6,086,973 A | 7/2000 | Hazes | 428/40.1 |
| 6,106,953 A | 8/2000 | Zimmermann et al. | 428/440 |
| 6,245,177 B1 | 6/2001 | Lühmann | 156/182 |
| 6,280,840 B1 | 8/2001 | Lühmann et al. | 428/343 |
| 6,284,378 B1 | 9/2001 | Junghans et al. | 428/421 |
| 6,395,389 B1 | 5/2002 | Lühmann et al. | 428/343 |

FOREIGN PATENT DOCUMENTS

| | | |
|---|---|---|
| CA | 2 396 983 A | 5/2002 |
| DE | 33 31 061 | 3/1985 |
| DE | 42 22 849 | 6/1993 |
| DE | 42 33 872 | 3/1994 |
| DE | 43 39 604 | 5/1995 |
| DE | 44 28 587 | 2/1996 |
| DE | 44 31 914 | 3/1996 |
| DE | 196 26 870 | 7/1996 |
| DE | 196 27 400 | 7/1996 |
| DE | 195 11 288 | 10/1996 |
| DE | 195 31 696 | 3/1997 |
| DE | 197 20 526 | 5/1997 |
| DE | 197 26 375 | 6/1997 |
| DE | 197 08 366 | 1/1998 |
| DE | 196 49 636 | 6/1998 |
| DE | 196 49 727 | 6/1998 |
| DE | 196 49 728 | 6/1998 |
| DE | 196 49 729 | 6/1998 |
| DE | 197 08 364 | 9/1998 |
| DE | 197 20 145 | 11/1998 |
| DE | 197 23 177 | 12/1998 |
| DE | 197 23 198 | 12/1998 |
| DE | 198 13 081 | 1/1999 |
| DE | 197 56 816 | 2/1999 |
| DE | 297 23 614 | 3/1999 |
| DE | 197 56 084 | 7/1999 |
| DE | 198 20 858 | 11/1999 |
| DE | 198 42 864 | 3/2000 |
| DE | 198 42 865 | 3/2000 |
| DE | 199 38 693 | 2/2001 |
| DE | 100 03 318 | 8/2001 |
| WO | WO 92/11332 | 7/1992 |
| WO | WO 92/11333 | 7/1992 |
| WO | WO 94/21157 | 9/1994 |
| WO | WO 95/06691 | 3/1995 |
| WO | WO 97/07172 | 2/1997 |
| WO | WO 98/03601 | 1/1998 |
| WO | WO 99/31193 | 6/1999 |
| WO | WO 99/37729 | 7/1999 |
| WO | WO 99/63018 | 12/1999 |
| WO | WO 00/12644 | 3/2000 |

OTHER PUBLICATIONS

"Butadiene Polymers", Concise Encyclopedia of Polymer Science and Engineering, JI Kroschwitz, Editor, 1990, pp. 97-98.*
Specification—U.S. Appl. No. 09/160,777, filed Sep. 24, 1998 English language counterpart to DE 195 31 696.
Specification—U.S. Appl. No. 09/073,509, filed May 6, 1998 English language counterpart to DE 197 20 145.
Specification—U.S. Appl. No. 08/976,802, filed Nov. 24, 1997 English language counterpart to DE 196 49 728.
Product Information Sheet for TUFTEC P1000, Dec. 12, 2001.

* cited by examiner

*Primary Examiner*—Daniel Zirker
(74) *Attorney, Agent, or Firm*—Norris, McLaughlin & Marcus

(57) ABSTRACT

An adhesive for an at least one-layer pressure sensitive adhesive sheet strip which is residuelessly and nondestructively redetachable by extensive stretching substantially in the bond plane, said adhesive being composed of at least one block copolymer having one or two end blocks composed of vinylaromatics, and a block composed of a conjugated diene, wherein the fraction of 1,2-linked diene is selectively hydrogenated.

17 Claims, No Drawings

ADHESIVE AND ITS USE FOR AN AT LEAST ONE-LAYER PSA SHEET STRIP WHICH CAN BE REDETACHED WITHOUT RESIDUE OR DESTRUCTION BY EXTENSIVE STRETCHING SUBSTANTIALLY IN THE BOND PLANE

The invention relates to an adhesive and to its use for a pressure sensitive adhesive (PSA) sheet strip based on styrene block copolymers which is highly stable to aging and can be used to create a connection which can be parted again by extensive stretching in the direction of the bond plane.

BACKGROUND OF THE INVENTION

Elastically or plastically highly extensible self-adhesive tapes which can be redetached without residue or destruction by extensive stretching in the bond plane are known for example from U.S. Pat. No. 4,024,312 A, DE 33 31 016 C2, WO 92/11332 A1, WO 92/11333 A1, DE 42 22 849 C1, WO 95/06691 A1, DE 195 31 696 A1, DE 196 26 870 A1, DE 196 49 727 A1, DE 196 49 728 A1, DE 196 49 729 A1, DE 197 08 364 A1, DE 197 20 145 A1, DE 198 20 858 A1, WO 99/37729 A1, and DE 100 03 318 A1 and are referred to below inter alia as strippable self-adhesive tapes.

Strippable self-adhesive tapes of this kind are frequently used in the form of single-sidedly or double-sidedly pressure-sensitively adhesive sheet strips which preferably have a non-adhesive grip area from which the detachment operation is initiated. Particular applications of corresponding self-adhesive tapes are to be found inter alia in DE 42 33 872 C1, DE 195 11 288 C1, U.S. Pat. No. 5,507,464 A, U.S. Pat. No. 5,672,402 A, and WO 94/21157 A1. Specific embodiments are also described in DE 44 28 587 C1, DE 44 31 914 C1, WO 97/07172 A1, DE 196 27 400 A1, WO 98/03601 A1, and DE 196 49 636 A1, DE 197 20 526 A1, DE 197 23 177 A1, DE 197 23 198 A1, DE 197 26 375 A1, DE 197 56 084 C1, DE 197 56 816 A1, DE 198 42 864 A1, DE 198 42 865 A1, WO 99/31193 A1, WO 99/37729 A1, WO 99/63018 A1, WO 00/12644 A1, and DE 199 38 693 A1.

Preferred fields of use of aforementioned strippable adhesive sheet strips include in particular the residuelessly and nondestructively redetachable fixing of light to moderately heavy articles in the home, workplace, and office segments. In these applications they replace conventional fastening means, such as drawing pins, roundhead needles, thumb tacks, nails, screws, conventional self-adhesive tapes, and liquid adhesives, for example. Key to the successful use of the abovementioned adhesive sheet strips is not only the possibility for residueless and nondestructive redetachment of bonded articles but also the quick and easy bonding thereof and the secure hold they provide for the envisaged period of bonding. It should be borne in mind here in particular that the adhesive strips must function on a large number of substrates in order to be able to serve as a universal fixing means in the home, workplace, and office segments.

Despite the fact that the patent literature cited above describes a broad range of pressure sensitive adhesives for use in strippable self-adhesive tapes, commercial products currently on the market (for example, tesa® Powerstrips® from tesa AG, 3M Command® Adhesive strips from 3M, and Plastofix® Formuli Force 1000 adhesive strips from Plasto S.A.) all have pressure sensitive adhesives based on styrene block copolymers. Typically, use is made of linear or radial block copolymers based on polystyrene blocks and polybutadiene blocks and/or polyisoprene blocks; i.e., for example, radial styrene-butadiene $(SB)_n$ and/or linear styrene-butadiene-styrene (SBS) and/or linear styrene-isoprene-styrene (SIS) block copolymers. Advantages of the aforementioned styrene block copolymer-based PSAs for use in strippable self-adhesive tapes are, for example, the very high bond strengths which can be achieved with them (owing, inter alia, to the simultaneous realization of very high cohesion and very high adhesive forces), pronounced reduction of tack during stretching detachment (which greatly facilitates, if not indeed being a precondition for, the detachment operation), and a very high tensile strength, which is essential in particular for a detachment operation with no tearing.

A disadvantage of the majority of the products available on the market with PSAs based on the abovementioned styrene block copolymers is their low aging stability, in particular their low UV stability. This is essentially due to the use of styrene block copolymers containing polydiene (polybutadiene, polyisoprene) blocks which are unsaturated in the elastomer block. Of course, it is possible to add aging inhibitors to the PSAs used, in the form, for example, of primary antioxidants, secondary antioxidants, C-radical scavengers, light stabilizers such as UV absorbers, sterically hindered amines, or additives which scatter or reflect the damaging electromagnetic radiation, in the form for example of fillers and/or color pigments, but such additions generally produce only a gradual improvement in aging stability, so that aging processes are only delayed for a limited time.

In comparison to polymers based on unsaturated hydrocarbons, however, the aging stability achieved, in particular the UV stability realized, remains low. For example, when abovementioned, commercially available self-adhesive strips are fixed to window glass, their bond to the glass surface after just a few weeks' sunlight exposure is so strong that it is no longer possible to redetach them without residue by extensive stretching.

Accordingly it is recommended not to bond tesa® Powerstrips® to windowpanes, since the redetachability of the Powerstrips® is impaired by insolation. The Japanese in-pack information for "Command® Adhesive" strips reveals that windowpanes exposed to sunlight are an unsuitable substrate.

One way of increasing the aging stability and in particular the UV stability when using styrene block copolymers is to use styrene block copolymers hydrogenated in the elastomer block, as actualized, for example, in styrene-ethylene/butylene-styrene (SEBS; obtained by hydrogenating SBS) and/or styrene-ethylene/propylene-styrene (SEPS; obtained by hydrogenating SIS) block copolymers.

However, a disadvantage of using such styrene block copolymers, hydrogenated in the elastomer block, is that the bond strengths realizable with these copolymers are, for experience, well below those achieved with the analogous styrene-butadiene-styrene and styrene-isoprene-styrene block copolymers which have not been hydrogenated in the elastomer block. This is especially so when in the adhesive formulations employed it is necessary to minimize or forego the addition of plasticizers such as liquid resins, plasticizer oils, low molecular mass liquid polyolefins, and the like. This may be the case, for instance, when the aforementioned adhesive constituents possess a tendency to migrate from the PSA into the bonded substrates and irreversibly alter them, a characteristic which is unacceptable particularly for adhesive strips designed for the residueless and nondestructive redetachment of the bonds.

A further disadvantage of the use of PSAs based on styrene block copolymers unsaturated in the elastomer block is the fact that, for the purpose of improving their UV stability and/or of masking tinges of color which may be caused, for example, by the tackifier resins used, these adhesives are frequently pigmented. Typical pigments which enhance the UV stability and at the same time give the PSA a neutral white or specifically colored appearance include, for example, various titanium dioxides or organic and inorganic color pigments.

A drawback of such pigmentations is that the PSAs provided with them generally do not possess optical transparency or colorlessness. A consequence of the pigmentation of the PSA, for example, is a clearly visible grip-tab region, which, since it protrudes from the bond joint, is frequently found visually disruptive by the user, or else a PSA strip which owing to the pigmentation is visible over its entire area, and which is found visually disruptive, for example, in connection with the fixing of transparent substrates.

A further disadvantage of nontransparent adhesive strips is the absent possibility, when bonding one or two transparent bond partners, of being easily able to visually detect the macroscopically achieved bond area through both adhesive layers; particularly in the case of critical bonds, this is an important indicator of the quality of bonding achieved.

Numerous avenues have been pursued in order to achieve invisibility in the nonadhesive grip-tab region which is required for detachment by extensive stretching. Thus WO 98/03601 A1, for instance, describes a strippable adhesive strip which at one end contains a polymeric film—a polyester film, for example—integrated approximately in the middle of the adhesive layer. In the region of the integrated polymeric film the surface of the adhesive is made nonadhesive on both sides, by coating further polymeric films onto it or by laminating, for instance. U.S. Pat. No. 5,925,459 A describes the use of a self-adhesive strip which is redetachable by extensive stretching and which uses as its intermediate carrier a transparent elastic polymeric film. As a result of its elastic character the intermediate carrier film is able to conform to the deformation of the PSA during the detachment operation. Regions of the intermediate carrier film which are not coated with PSA serve as nonadhesive transparent grip-tab regions from which the detachment operation can be initiated and completed.

Many of the abovementioned documents incorporate the use of PSAs which in general have a high transparency and at the same time a high aging stability, in particular a very high UV stability. For example, WO 92/11332 A1, WO 92/11333 A1, and DE 195 31 696 A1 disclose the use of PSAs based on acrylate copolymers. Of these PSAs it is known, however, that the bond strengths that can generally be achieved using them, and in particular the achievable ultimate tensile stress strengths, are well below the strengths realizable with styrene block copolymer-based PSAs. Consequently, such PSAs are completely unsuitable in particular for use in single-layer strippable self-adhesive tapes, since in that case very high ultimate tensile stress strengths are vital for a reliable detachment operation.

DE 42 22 849C1, DE 197 08366 A1, DE 196 49 727 A1, DE 196 49 728 A1 and DE 196 49 729 A1 describe the utilization of styrene block copolymers based on SEBS and/or SEPS, including the use of styrene block copolymers chemically saturated in the elastomer block. However, experience has shown that, with conventional styrene block copolymers based on SEBS and/or SEPS, it is impossible to produce PSAs possessing simultaneously a high tensile strength, excellent peel strengths, high tip shear strengths, and low detachment forces (stripping forces).

A transparent UV-stable adhesive with enhanced bond strength that is suitable for use in strippable adhesive sheet strips is described in DE 100 03 318 A1.

Through the use of a special styrene block copolymer based on a hydrogenated middle block which contains nonhydrogenated polymeric side chains it is possible to produce adhesives for strippable adhesive sheet strips.

For the bonding of heavy articles such as hooks for hand towels or textiles, however, adhesives described above are not suitable, since, although the adhesive performance is increased distinctly as compared with that of adhesives comprising SEBS or SEPS, it still lies a considerable way below the bond performance of adhesives based on SIS or SBS.

It is an aim of the invention, therefore, to provide an adhesive which is suitable for a pressure sensitive adhesive strip which both is UV-stable and has a higher bond performance than existing systems, especially transparent UV-stable strippable systems, and which as far as possible is itself transparent.

SUMMARY OF THE INVENTION

The object is achieved in accordance with the invention by adhesives which are based on styrene block copolymer mixtures and which are used to produce pressure sensitive adhesive sheet strips.

DETAILED DESCRIPTION OF THE INVENTION

The invention accordingly provides an adhesive for an at least one-layer pressure sensitive adhesive sheet strip which is residuelessly and nondestructively redetachable by extensive stretching substantially in the bond plane, said adhesive being composed of
- at least one block copolymer having one or two end blocks composed of vinylaromatics, and
- a block composed of a conjugated diene, wherein the fraction of 1,2-linked diene is selectively hydrogenated.

In a first advantageous embodiment the block copolymers have a polyvinylaromatics fraction of from 10% by weight to 35% by weight, preferably between 15% by weight and 32% by weight.

In a further advantageous embodiment the fraction of the styrene block copolymer relative to the total adhesive is from 20 to 70% by weight, preferably from 30 to 60% by weight, very preferably from 35 to 55% by weight.

PSAs based on aforementioned polymers are obtained by blending with tackifier resins and also, optionally, further additives such as, for example, antioxidants, in-process stabilizers, light stabilizers, processing assistants, and, if desired, further polymers, preferably further elastomers. Plasticizers, such as liquid resins, plasticizer oils or low molecular mass liquid polymers, for example, are used only in very small amounts of < about 5% by weight, and preferably are not used at all.

PSAs of the invention are based on the use of selected special block copolymers. The pressure-sensitive adhesiveness of the polymer mixtures is achieved by adding tackifier resins that are miscible with the elastomer phase. As further blend components it is possible to make use, inter alia, of plasticizers, aging inhibitors, processing assistants, fillers, dyes, optical brighteners, stabilizers, endblock reinforcer resins, and, where appropriate, further polymers, which are preferably elastomeric in nature.

Styrene Block Copolymer Mixtures

In the preparation of block copolymers based on vinylaromatics, preferably styrene and 1,3-dienes, especially isoprene and butadiene, both 1,2-linked and 1,4-linked dienes are incorporated into the diene block. The fraction of 1,2-dienes can be controlled by the solvent, the temperature or the catalyst. Since the 1,2-linked dienes contain a terminal double bond, while the double bond in the case of the 1,4-linked dienes is in the main chain, a selective hydrogenation of the terminal and hence more reactive double bonds is possible.

Styrene block copolymer mixtures of the invention comprise at least one block copolymer having one or two terminal blocks consisting of vinylaromatics, and a block composed of a conjugated diene wherein the fraction of 1,2-linked diene is selectively hydrogenated.

The vinylaromatics preferably comprise in particular partly hydrogenated styrene-isoprene-styrene block copolymers, styrene-butadiene-styrene block copolymers or a mixture of the two.

In another advantageous embodiment the block copolymers possess polystyrene endblocks.

Further suitable for utilization in accordance with the invention are functionalized block copolymers, such as maleic anhydride-modified, silane-modified or epoxidized block copolymers, for example.

The above-described block copolymers can further be blended with other block copolymers. Owing to the UV stability which is to be achieved those used for blending should include in particular copolymers based on hydrogenated elastomers, particularly on hydrogenated block copolymers, such as poly-styrene-ethylene/butylene-styrene or poly-styrene-ethylene/propylene-styrene block copolymers.

The UV stability of adhesives based on non-hydrogenated block copolymers (SIS or SBS) can be distinctly improved by a blend of the partly hydrogenated block copolymers described above.

The partly hydrogenated block copolymers described above have the advantage over the block copolymers which are fully hydrogenated in the elastomer portion of being compatible with a greater number of resins. On the other hand, the aging stability is only slightly poorer, but is distinctly improved over that of the nonhydrogenated block copolymers. Owing to the double bonds which still exist in the partly hydrogenated elastomers, the bond performance is substantially improved over that of systems having block copolymers fully hydrogenated in the elastomer portion, allowing bonding performances close to that of adhesives comprising nonhydrogenated block copolymers to be achieved.

Moreover, the elongation of the partly hydrogenated block copolymers is greater than that of the fully hydrogenated systems, thereby improving the detachment operation.

The total amount of block copolymers in formulations of the invention is from 27.5% by weight to 62.5% by weight, preferably from 35% by weight to 57.5% by weight, more preferably from 37.5% by weight to 55% by weight.

The vinylaromatics content is preferably between 10% by weight and 35% by weight, more preferably between 15% by weight and 32% by weight. The diblock content can be between 0 and 70% by weight.

Tackifiers

Tackifiers to be employed can be used both alone and in a mixture.

Owing to the requirement of colorlessness, PSAs of the invention utilize as the main component of their tackifiers hydrogenated tackifier resins in particular. Those with preferred suitability include the following:

hydrogenated polymers of dicyclopentadiene (for example, Escorez 5300 series, Exxon Chemicals)

hydrogenated polymers of preferably C-8 and C-9 aromatics (for example, Regalite and Regalrez series; Eastman Chemicals//Arkon P series, Arakawa); these can be formed by hydrogenating polymers comprising pure aromatic streams or by hydrogenating polymers of mixtures of different aromatics partially hydrogenated polymers of C-8 and C-9 aromatics (for example, Regalite and Regalrez series, Eastman Chemicals//Arkon M; Arakawa)

hydrogenated polyterpene resins (for example, Clearon M; Yasuhara)

hydrogenated C-5/C-9 polymers (for example, ECR-373; Exxon Chemicals)

aromatics-modified, selectively hydrogenated dicyclopentadiene derivatives (for example, Escorez 5600 series; Exxon Chemicals) and fully and partly hydrogenated rosin-based resins (for example, Foral, Foralyn; Eastman Chemicals//Hydrogral; DRT).

The last-mentioned tackifier resins can be used either alone or in a mixture.

Nonhydrogenated tackifier resins, for example, C-5, C-9, C-5/C-9 hydrocarbon resins, polyterpene resins, aromatics-modified polyterpene resins or rosin derivatives, can be present in small amounts in formulations of the invention. However, their total concentration typically does not exceed 30% by weight, and preferably does not exceed 20% by weight, of the overall constituents of the adhesive.

If the pressure sensitive adhesives are to have a water-clear transparency in appearance, the tackifier resins to be used are those whose inherent color does not exceed 2.0, as measured in accordance with the Gardner color scale, when used at a concentration of 50% by weight and a film thickness of 500 μm. In accordance with the concentration at which they are used, tackifier resins utilized in smaller amounts may also have inherent colors with a Gardner number>2.0.

According to DIN ISO 4630 (1982-11) the Gardner color number is a number characterizing the color of clear liquids (for example, binders for paints and coating materials). It is determined by a visual comparison of the color of a sample in a glass tube with the color of defined standards. The color of the sample which comes closest to the color standard in question is designated as the Gardner color number. The reference standards used for the Gardner color scale are 18 glass color standards each with defined chromaticity coordinates and light transmittances.

Further Blend Components

As further additives it is possible typically to use the following:

primary antioxidants, such as sterically hindered phenols, for example secondary antioxidants, such as phosphites or thioethers, for example in-process stabilizers, such as C-radical scavengers, for example light stabilizers, such as UV absorbers or sterically hindered amines, for example processing assistants endblock reinforcer resins, and if desired, further polymers, preferably elastomeric in nature; elastomers which can be utilized accordingly include those based on pure hydrocarbons, unsaturated polydienes for example, such as natural or synthetically produced polyisoprene or polybutadiene, chemically substantially saturated elastomers, such as saturated ethylene-propylene copolymers, α-olefin copolymers, polyisobutylene, butyl rubber, ethylene-propylene rubber, and chemically functionalized hydrocarbons, such as halogen-containing, acrylate-containing or vinyl ether-containing polyolefins, to name but a few.

Plasticizing agents, such as liquid resins, plasticizer oils or low molecular mass liquid polymers, for example, such as low molecular mass polybutenes having molar masses<1500 g/mol (number average), for example, are used only in very small amounts of $\leq 5\%$ by weight; preferably they are not used at all.

Preparation of the PSAs

The PSAs can be prepared and processed from solution, from dispersion, and from the melt. Preferred preparation and processing methods take place from solution and also from the melt. Particular preference is given to the manufacture of the adhesive from the melt, in which case it is possible in particular to use batch processes or continuous processes. The continuous manufacture of the PSAs by means of an extruder is particularly advantageous.

Product Construction

PSAs of the invention can be used both for single-layer self-adhesive tapes redetachable without residue or destruction by extensive stretching (for example in accordance with DE 33 31 016 C2 or DE 42 22 849 C1 or WO 98/03601 A1) and for multilayer self-adhesive tapes with or without an intermediate foam carrier (for example in accordance with DE 197 08 366 A1, DE 198 20 858 A1, WO 92/11333 A1, DE 196 49 727 A1, DE 196 49 728 A1, DE 196 49 729 A1, DE 197 20 145 A1, U.S. Pat. No. 5,516,581 A or WO 95/06691 A1).

In the case of their use in multilayer self-adhesive tapes in accordance with DE 197 08 366 A1 PSAs of the invention may form the middle layers, inner layer, and outer layers of the adhesive strips.

Where adhesives of the invention are used as outer layers, internal layers may selectively be constructed on the basis of adhesives based on styrene block copolymers saturated in the elastomer block and adhesives based on styrene block copolymers unsaturated in the elastomer block. In the latter case the outlying PSA layers typically contain UV stabilizers, UV absorbers for example, which reduce the UV exposure of the inner layers.

An advantage of the use of multilayer product constructions in accordance with DE 197 08 366 A1 is the possibility through appropriate formulation of the inner adhesive layers, for example, of controlling the stripping forces very largely independently of the adhesional properties.

Aforementioned product constructions including intermediate foam carriers in accordance with DE 196 49 727 A1, DE 196 49 728 A1, DE 196 49 729 A1, DE 197 20 145 A1, U.S. Pat. No. 5,516,581 A or WO 95/06691 A1 are likewise suitable but owing to the light scattering from the foam pores are not transparent. Adhesive strips can be formed in accordance with DE 44 28 587 C2 and U.S. Pat. No. 5,925,459 A and/or modified in accordance with DE 44 31 914 C2. PSAs of the invention can likewise be utilized in products according to DE 43 39 604 C2.

Double-sidedly/Single-sidedly Pressure-sensitively Self-adhesive Tapes

PSAs of the invention can be used for both single-sidedly and double-sidedly pressure-sensitively self-adhesive tapes redetachable without residue or destruction by extensive stretching. Single-sidedly pressure-sensitively self-adhesive tapes can be obtained in this case for example by rendering one side of the aforementioned double-sidedly pressure-sensitively self-adhesive tapes or strips inert.

Converting

Typical converted forms of self-adhesive tapes utilizing the PSAs of the invention are adhesive tape rolls and adhesive strips, such as are obtained, for example, in the form of diecuts. Diecuts optionally contain a nonadhesive grip-tab region from which the detachment operation can be initiated and performed.

Although the novel PSAs described here are to be used primarily in self-adhesive tapes and/or strips redetachable without residue or destruction by extensive stretching, they are also appropriate, owing to the advantages described herein of a high bond strength in combination with high peel strength and a very high aging stability, in particular a very high UV stability, for use in double-sidedly pressure-sensitively self-adhesive tapes designed for permanent fixing.

Test Methods

The tensile strength and maximum elongation was measured by a method based on DIN 53504 using S3-sized dumbbells at a separation speed of 300 mm per minute, unless noted otherwise.

The detachment force (stripping force) is determined by bonding an adhesive sheet measuring 50 mm long×20 mm wide with a nonadhesive grip-tab region at the top end between two steel plates, arranged congruently with one another and measuring 50 mm×30 mm, using an application pressure of 500 newtons in each case but otherwise as described for the tip shear strength (tip shear stability time). At their bottom end the steel plates each have a bore to accommodate an S-shaped steel hook. The lower end of the steel hook carries a further steel plate which allows the test arrangement to be fixed in the lower clamping jaw of a tensile testing machine for the purpose of measurement. The adhesive bonds are stored at +40° C. for a duration of 24 hours. After reconditioning to room temperature the adhesive sheet strip is detached with a pulling speed of 1000 mm per minute parallel to the bond plane and without contact to the edge regions of the two steel plates. During this procedure the required detachment force is measured in newtons (N). The parameter stated is the average value of the stripping stress values (in N/mm²), measured in the range in which the adhesive strip has undergone detachment from the steel substrates over a bonding length of between 10 mm and 40 mm.

For the determination of the peel strength the PSA strip samples for investigation are laminated over the entire area of one side with a 23 µm PET film (Hostaphan RN 25; Mitsubishi Chemicals) without air bubbles. After this has been done, the second adhesive sheet strip side is covered at one end with a film strip (again Hostaphan RN 25) about 6 mm long, thereby forming at this end a nonadhesive grip-tab region on both sides. Thereafter the adhesive sheet strip under test is bonded by its front side, using gentle finger pressure, to the test substrate (coated woodchip wallpaper: wallpaper=Erfurt Körnung 52, paint=Herbol Zenit LG, wallpaper bonded to compressed chipboard). The samples are then pressed for 10 seconds at an applied pressure of 90 N per 10 cm$^2$ of bond area and thereafter conditioned at 40° C. for 15 minutes. The test plates are then fixed horizontally so that the grippable area of the adhesive strips is pointing downward. Using a clamp (20 g), a 50 g weight is fastened to the nonadhesive grip tab, so that the resulting peel load (about 0.7 N per 20 mm of adhesive strip width) acts orthogonally to the bond plane. After a test phase of 15 minutes, and a repeat after 24 hours, a mark is made of the distance over which the adhesive strip has peeled away from the bond substrate since the beginning of the test. The distance between the two marks is reported as the peel path (units: mm per 24 hours).

For the determination of the tip shear strength the adhesive sheet under test, measuring 20 mm×50 mm and provided at one end on both sides with a nonadhesive grip-tab region (obtained by laminating on a 25 µm biaxially oriented polyester film measuring 20 mm×13 mm (Hostaphan RN 25)), is bonded to the center of a highly polished square steel plate measuring 40 mm length×40 mm width×3 mm thickness. On its back, the steel plate is provided centrally with a 10 cm steel rod which sits vertically on the surface of the plate. The resulting test specimens are bonded to the test substrate (steel) with a force of 100 N, with a press-on time of 5 seconds, and are left in the unloaded state for 5 minutes. After the chosen tip shear load has been applied by attaching a suspended weight (20 N in the case of a 50 mm lever arm) a measurement is made of the time which elapses until the bond fails (i.e., tip shear stability time). The test conditions are 23° C. with a relative atmospheric humidity of 50%.

These test conditions correspond to a distinct overload, specifically a torque increased approximately 10 times over that which arises when a normal user employs such an adhesive strip for a bonding application. Such an overload is indispensable in order to reveal differences between individual adhesives within a reasonable time.

In order to test the UV stability, 20 adhesive strips each measuring 20 mm×50 mm and provided with a grip tab as described for the stripping stress measurements were bonded to a glass plate. Thereafter a piece of paper measuring 40 mm×40 mm was adhered to the adhesive strip, leaving the grip tab, which had been provided with a UV-opaque liner, protruding from the joint, and was pressed on with a force of 100 N. The adhesive strips were then stored in a UV tester from Atlas for 10 days in such a way that the UV light was able to pass through the glass plate and strike the adhesive strip. The irradiation dose was 500 W/m$^2$ and the black panel temperature was 25° C. After the 10 days of storage the adhesive strips were removed by pulling, which was carried out at an angle of 15°. A note was made of the number of adhesive strips which tore.

Production of the Test Specimens

Production of the PSA Strips

Here, the PSAs were processed to a homogeneous mixture in a heatable compounder with sigma blades (Werner und Pfleiderer LUK 1.0 K3 equipped with an LTH 303 thermostat from mgw LAUDA) at a temperature of about +160 to +180° C. with $CO_2$ inert gas blanketing. After cooling, the adhesive was extruded for about 10 minutes at from +120° C. to +140° C. into a temperature-controllable press (type KHL 50 from Bucher-Guyer) to produce single-layer adhesive sheet sections. The thickness of the films for a single-layer construction was 700 µm while for a multilayer construction it was 500 µm±50 µm for the inner layer and 100 µm±20 µm for the outer layers.

EXAMPLES

The invention is illustrated below by a number of examples, without wishing thereby to restrict the invention.

0.5 parts of Irganox 1010 as aging inhibitor and 0.5 part of Tinuvin P as UV absorber were added to all of the examples.

Comparative Example 1

Single-layer construction (700 µm thickness):
50 parts Kraton G 1650
50 parts Regalite R 1100

Example 2

Single-layer construction (700 µm thickness):
25 parts Kraton G 1650
25 parts Tuftec P 1000
50 parts Regalite R 1100

Comparative Example 3

Single-layer construction (700 µm thickness):
50 parts Vector 4211
50 parts Regalite R 1100

Example 4

Single-layer construction (700 µm thickness):
25 parts Vector 4211
25 parts Tuftec P 1000
50 parts Regalite R 1100

Example 5

Multilayer construction:
Middle layer (500 µm)
50 parts Vector 4211
50 parts Regalite R 1100
Outer layers (each 100 µm):
50 parts Tuftec P 1000
50 parts Regalite R 1100
Properties of the base materials used:
Kraton G 1650 SEBS, 100% by weight 3-block; block polystyrene content: about 30% by weight; Kraton Polymers
Vector 4211 SIS, >95% by weight 3-block; block polystyrene content: 30% by weight; Exxon Chemical Tuftec P 1000 SBBS (styrene-butadiene-butylene-styrene), about 35% by weight 3-block, about 65% by weight 2-block; block polystyrene content: about 30% by weight, Asahi Kasei Regalite R 1100 hydrogenated aromatic resin; softening temperature (Ring & Ball): about +99° C.; Eastman Irganox 1010 sterically hindered phenol; Ciba Additive Tinuvin P UV absorber, Ciba Additive On the exemplary PSA strips the following mechanical and adhesional data were measured:

| PSA of example | Tensile strength in MPa// elongation in % | Stripping stress in MPa | Peel rate in mm/24 h | Tip shear stability time in days | Number of instances of tearing in the UV test |
|---|---|---|---|---|---|
| 1 | 10.2//740 | 1.5 | 60 | 1 | 0 |
| 2 | 9.4//1960 | 1.3 | 24 | 32 | 2 |
| 3 | 12.7//1220 | 1.7 | 7 | 58 | 18 |
| 4 | 11.5//1180 | 1.5 | 9 | 42 | 8 |
| 5 | 10.5//1210 | 1.6 | 6 | 50 | 1 |

The use of SBBS (styrene-butadiene-butylene-styrene) leads to an improvement in the adhesional properties when it is blended with hydrogenated SEBS. As evident from example 2 the tensile strength decreases only slightly and the UV stability is retained. In a mixture of SBBS and SBS the UV stability is distinctly increased, with a slight deterioration in the bond strengths. The ideal choice are multi-layer constructions in which SBBS is used in the outer layer. In that case the combination of bond performance and UV stability is optimized.

I claim:

1. An adhesive for an at least one-layer pressure sensitive adhesive sheet strip which is residuelessly and nondestructively redetachable by extensive stretching substantially in the bond plane, said adhesive being comprised of
   at least one block copolymer having one or two end blocks composed of vinylaromatics, and
   a block composed of a conjugated diene, wherein the fraction of 1,2-linked diene is selectively hydrogenated.

2. An adhesive as claimed in claim 1, containing from 20 to 70% by weight of styrene block copolymer, relative to the total adhesive.

3. An adhesive as claimed in claim 2, containing from 30 to 60% by weight of styrene block copolymer, relative to the total adhesive.

4. An adhesive as claimed in claim 3, containing from 35 to 55% by weight of styrene block copolymer, relative to the total adhesive.

5. An adhesive as claimed in claim 1, wherein the vinylaromatics are partly hydrogenated styrene-isoprene-styrene block copolymers, styrene-butadiene-styrene block copolymers or a mixture of the two.

6. An adhesive as claimed in claim 1, comprising styrene block copolymers which are completely hydrogenated in the elastomer block and are based on styrene-ethylene/butylene-styrene and/or styrene-ethylene/propylene-styrene.

7. An adhesive as claimed in claim 1, wherein the vinyl aromatic block copolymers are maleic anhydride-modified, silane-modified or epoxidized.

8. An adhesive as claimed in claim 1, wherein the block copolymers possess polystyrene endblocks.

9. An adhesive as claimed in claim 1, wherein the block copolymers comprise from 10% by weight to 35% by weight polyvinylaromatics.

10. An adhesive as claimed in claim 9, wherein said block copolymers comprise from 15% by weight to 32% by weight polyvinylaromatics.

11. An adhesive as claimed in claim 1, further comprising tackifier resins.

12. An adhesive as claimed in claim 1, comprising further components selected from the group consisting of plasticizers, aging inhibitors, processing assistants, fillers, dyes, optical brighteners, stabilizers, and endblock reinforcer resins.

13. An at feast one-layer pressure sensitive adhesive sheet strip which is residuelessly and nondestructively redetachable by extensive stretching substantially in the bond plane, having the adhesive of claim 1 on at least one side thereof.

14. The pressure sensitive adhesive sheet strip of claim 13, wherein said at least one-layer is two or three layers.

15. The pressure sensitive adhesive sheet strip of claim 13, wherein the adhesive sheet strip includes an intermediate foam carrier.

16. The pressure sensitive adhesive sheet strip of claim 14, wherein the adhesive sheet strip includes an intermediate foam carrier.

17. The adhesive of claim 1, wherein said at least one block copolymer is a styrene-butadiene-bulylene-styrene block copolymer.

* * * * *